United States Patent
Lev et al.

(10) Patent No.: US 8,332,374 B2
(45) Date of Patent: Dec. 11, 2012

(54) EFFICIENT IMPLICIT PRIVATIZATION OF TRANSACTIONAL MEMORY

(75) Inventors: Yosef Lev, Cambridge, MA (US); Nir N. Shavit, Cambridge, MA (US); David Dice, Foxboro, MA (US); Mark A. Moir, Windham, NH (US)

(73) Assignee: Oracle America, Inc., Redwood Shores, CA (US)

( * ) Notice: Subject to any disclaimer, the term of this patent is extended or adjusted under 35 U.S.C. 154(b) by 569 days.

(21) Appl. No.: 12/101,316

(22) Filed: Apr. 11, 2008

(65) Prior Publication Data

US 2008/0256074 A1   Oct. 16, 2008

Related U.S. Application Data

(60) Provisional application No. 60/923,445, filed on Apr. 13, 2007.

(51) Int. Cl.
  *G06F 7/00*  (2006.01)
  *G06F 17/00* (2006.01)
  *G06F 13/14* (2006.01)

(52) U.S. Cl. .................................... 707/704; 707/687

(58) Field of Classification Search ........... 707/999.008, 707/1/1, 703–704, 609, 791; 711/152–163, 711/147, 219, 202, 210; 718/100–108; 710/200; 712/209

See application file for complete search history.

(56) References Cited

U.S. PATENT DOCUMENTS 6,810,470 B1 * 10/2004 Wiseman et al. ............. 711/163
7,191,272 B2 *  3/2007 McKenney .................... 710/200

* cited by examiner

*Primary Examiner* — Tony Mahmoudi
*Assistant Examiner* — Cecile Vo
(74) *Attorney, Agent, or Firm* — Park, Vaughan, Fleming & Dowler LLP

(57) ABSTRACT

Apparatus, methods, and program products are disclosed that provide a technology that implicitly isolates a portion of a transactional memory that is shared between multiple threads for exclusive use by an isolating thread without the possibility of other transactions modifying the isolated portion of the transactional memory. In some of the described embodiments read locations of a shared memory are covered by a first set of lock objects, and write locations are covered by a second set of lock objects, each lock object in each set having a reader mode and a writer mode. Some of these embodiments acquiring each lock object in the first set using the reader mode, and acquire each lock object in the second set using the writer mode. These embodiments store result data values at write locations in the shared memory subsequent to the acquiring said first and second set of lock objects.

19 Claims, 8 Drawing Sheets

EFFICIENT IMPLICIT PRIVATIZATION OF TRANSACTIONAL MEMORY

CROSS-REFERENCE TO RELATED APPLICATIONS

This application claims priority under 35 U.S.C Section 119(e) to U.S. Provisional Patent Application 60/923,445, filed Apr. 13, 2007, entitled EFFICIENT IMPLICIT PRIVATIZATION.

The following references are incorporated by reference and contain non-essential matter: 1) U.S. Provisional Patent Application No. 60/775,580, filed: Feb. 22, 2006, entitled TRANSACTIONAL LOCKING, which is incorporated by reference herein; 2) U.S. patent application Ser. No. 11/475,716, filed Jun. 27, 2006, entitled METHOD AND APPARATUS TO IMPLEMENT PARALLEL TRANSACTIONS, which is incorporated by reference herein; 3) U.S. Provisional Patent Application No. 60/789,483, filed Apr. 5, 2006, entitled GLOBALLY VERSIONED TRANSACTIONAL LOCKING, which is incorporated by reference herein; 4) U.S. patent application Ser. No. 11/475,814, filed Jun. 27, 2006, entitled METHODS AND APPARATUS TO IMPLEMENT PARALLEL TRANSACTIONS, which is incorporated by reference herein; and 5) U.S. patent application Ser. No. 11/699,802, filed Jan. 30, 2007, entitled METHODS AND APPARATUS TO IMPLEMENT PARALLEL TRANSACTIONS, which is incorporated by reference herein.

BACKGROUND

1. Technical Field

The disclosed technology relates to the field of transactional computer memory.

2. Background Art

To increase performance, modern computers are using SMP (Symmetric Multi-Processor) architectures where multiple processing units access some amount of shared memory. Because each processor can asynchronously access the shared memory, concurrency-control techniques are used to coordinate the processors' access to the shared memory such that the access do not conflict. Each processor has one or more threads-of-execution. Traditionally, the programmer of these threads uses mutual exclusion locks to control each thread's access to the shared memory.

A set of concurrently executing threads on the same or different processors can use pessimistic- or optimistic-concurrency-control to safely moderate access to shared mutable data (for example locations in a shared memory that are shared by threads executing on a single processor as well as those shared by threads executing on different processors). Pessimistic-concurrency-control prevents undesirable or inopportune interleavings of access to the shared memory by means of mutual exclusion (locks) while optimistic-concurrency-control can detect and recover from inopportune interleavings of access to the shared memory by aborting conflicting operations on the shared memory and retrying the aborted operations.

Pessimistic-concurrency-control by mutual exclusion runs counter to the software engineering principle of "abstraction and encapsulation" where the details of mutual exclusion primitives are usually left opaque to the programmer. In addition there are difficult tradeoffs between designing a coarse-grained or fine-grained locking application because deadlock possibilities exist once more than one lock is used (and the programmer must be aware of which locks are required for correct operation by each critical section). In addition with more than one lock mutual exclusion is not "composable" in that primitive lock-based operators can not be combined into larger composite atomic operations without imposing and understanding lock hierarchies. Thus, a programmer must know all the locks that could be accessed in each of the primitive building block operators. However application performance improves with an appropriate number of locks. Thus, pessimistic-concurrency-control by mutual exclusion is difficult and error prone.

Transactional memory (TM) is an optimistic-concurrency-control technology that provides accesses to shared memory in a concurrent computing context that are analogous to database transactions. A transaction in the transactional memory context can be considered as a programmed procedure that performs a logical-unit-of-work that executes a series of memory load operations and memory store operations to the shared memory. These memory load operations and memory store operations logically occur at a single instant in time (that is, intermediate states are not visible to other successful transactions).

Optimistic-concurrency-control can be implemented as a transaction system that provides transactional capabilities to access the shared memory (the transactional memory). Similar to database transactions, the transaction is attempted—but if an access conflict is detected or the set of observed data values loaded from the shared memory becomes inconsistent, the transaction is aborted (without modifying the contents of the primary locations in the shared memory—although transactional metadata that resides in the shared memory may be modified) and re-attempted. Using optimistic-concurrency-control a programmer can identify the critical code sections such that the runtime system can serialize operations on the shared memory while still allowing parallelism. Thus, transactions that do not conflict may execute in parallel, while transactions that do conflict are aborted and transparently retried. Optimistic-concurrency-control mechanisms provide the programmer with a well-understood and less error-prone data access model. Optimistic-concurrency-control mechanisms can have performance that is competitive with fine-grain locking (so long as the application has some degree of disjoint access parallelism to the shared memory).

A transaction that accesses a transactional memory can include a speculative execution phase (where memory load operations from, and memory store operations intended for, the shared memory are tracked), followed by a commit phase that, if successful, exposes the tracked memory store operations to other transactions that access the transactional memory. When the transaction loads a data value from the shared memory it also enters a read-set entry into the its read-set that identifies the location in the shared memory from which the data value was loaded. If a data value that was loaded from the shared memory during the speculative execution phase of the transaction was concurrently modified by some other transaction (executing on the same or different processor) the data values at the locations identified by the transaction's read-set during the speculative execution phase cannot be known to be consistent and so the transaction aborts. Once the transaction aborts it can be retried with the hope that the data values loaded from the shared memory during the subsequent speculative execution phase will not be modified during the retry. The body of a transaction can be thought of as a function that takes the read-set as input (from which additional members of the read-set may be determined) and computes a write-set and possibly some thread-local outputs. If the data values corresponding to the read-set are modified while the transaction is in the midst of its computations then the transaction's results are potentially corrupt and thus the transaction aborts (and may be retried).

A transaction system exposes the tracked memory store operations in the shared memory in accordance with either a "speculative-store-buffer" policy or an "update-in-place" policy. The transaction's write-set generally includes write-set entries that identify which locations in the shared memory are to be (or have been) modified. Under the "speculative-store-buffer" policy, transactional stores (that record the data value corresponding to a location in shared memory) are kept in a speculative-store-buffer (the write-set) pending a successful commit. If the transaction commits successfully those pending stores will have been transferred from the speculative-store-buffer to their ultimate locations in the shared memory. If the transaction aborts, the contents of the speculative store buffer are discarded and the corresponding data values at write locations in the shared memory are not altered.

Under the "update-in-place" policy tentative stores by the transaction are directed "in-place" to the write locations in the shared memory. Under this policy, the transaction system must be able to roll-back or undo the tentative stores made to the shared memory by the transaction if the transaction aborts. Generally, the original data values of the stored-to shared memory locations are kept in an undo log. If the transaction aborts, the undo log is used to roll-back the in-place stores that were made to the shared memory. In addition, transactional memory load operations and memory store operations performed by another transaction are not allowed to overwrite or load the in-place stores performed by this transaction until after this transaction commits. Under both policies, transactional memory store operations to the shared memory are deferred in the sense that memory store operations performed by one transaction are not made visible to other transactions until the one transaction successfully commits.

Transactional support can be implemented in hardware, as hardware transactional memory (HTM), in software as software transactional memory (STM), or a hybrid of hardware and software (HyTM).

The Transactional Locking (TL) family of STMs (TL STM) uses versioned lockwords to support the transactional memory capability. Each location in the transactional portion of the shared memory is associated with a versioned lockword that "covers" that location (a single versioned lockword can cover multiple locations in the shared memory). The transaction maintains a record of which locations were read from the shared memory (the read-set) and which locations in the shared memory will be (or have been) written with the result data values when the transaction commits (the write-set). The transaction's read-set locks are the set of locks that cover the locations in the shared memory represented by the transaction's read-set. The transaction's write-set locks are the set of locks that cover the locations in the shared memory represented by the transaction's write-set. The read-set and/or write-set can also be partially or completely stored in the shared memory.

A versioned lockword can be a word in memory that includes a lock portion that serves as a lock in the computer science sense, and a version number field that holds a version number. The versioned lockword can be, or be contained in, a lock object. The version numbers are used to track shared memory consistency through the life of a transaction. The versioned lockwords can be stored in the shared memory in a structure that is distinct from the shared data (in that sense, the versioned lockwords are metadata about the shared locations). A function that maps a location in shared memory to a lock can associate a contiguous block of shared memory locations (for example, a stripe) with a given versioned lockword (a stripe-lock). Other data-lock arrangements can also be used.

FIG. 1 illustrates a multi-processor, shared memory system 100 that represents the conceptual aspects of transactional memory in a multi-processor system using a shared memory. The multi-processor, shared memory system 100 includes a shared memory bus 101 that makes a shared memory 103 available to a first processor 105 through an Nth processor 107 using any of a variety of well known shared memory access technologies that enable the processors to operate a lock in the shared memory. The first processor 105 can execute computer instructions from its own local memory (such as a first processor local memory 108) or from the shared memory 103.

Multiple threads-of-execution can access the shared memory 103. The multiple threads can be distributed though the first processor 105 through the Nth processor 107, and each processor can itself have multiple threads. For example, the first processor 105 can include a thread that executes a first transaction 109 and a thread that executes a second transaction 111. These threads can access a transactionally shared data region 113 of the shared memory 103 as a transactional memory. The shared memory 103 can also contain a transactional metadata region 115 to provide information about the state of the transactionally shared data region 113. This information can include metadata used to lock locations for exclusive access by a transaction as well as metadata used to detect conflicts between transactions. In some embodiments, the shared memory 103 contains an optional global clock region 117 to assist with particular transactional memory protocols. A transaction is performed by a thread-of-execution. Some threads perform a single transaction during the thread's lifetime; other threads can perform multiple transactions.

The first transaction 109 can include a first transaction write-set 119 and a first transaction read-set 121 either in the first processor local memory 108 (as shown in the figure) or in the shared memory 103. Generally, other transactions would have similar structures (for example the second transaction 111 includes a second transaction write-set 123 and a second transaction read-set 125). The read-set and write-set (together with the information in the transactional metadata region 115) maintain information that is used by the transaction system to determine whether a conflict has occurred between transactions and to take appropriate action if such conflict should happen.

One skilled in the art will understand that there are many different shared memory technologies that, for example, can use processor cache lines, multiple memory access paths, etc, and that such technologies are conceptually equivalent to that shown. These different technologies provide different solutions and approaches to handling access contention between the multiple processors that share the shared memory. These problems and approaches are known to one skilled in the art. Such a one will also understand that the transactionally shared data region 113 and the transactional metadata region 115, while shown in the figure as being defined regions in the shared memory 103 can, in fact be scattered through-out the shared memory 103 without limitation other than as required for the lock structure (for example, stripe-locks or cache-line locks may require more explicit placement for a fragmented implementation of the transactionally shared data region 113.

A stripe is a contiguous region of shared memory that maps to a given versioned lockword. Typical stripe widths for an STM are either one fullword or one memory cache line. If stripes are wide then an update transaction may tend to require fewer high-overhead atomic operations (for example, compare-and-swap (CAS)) at commit-time to acquire the locks covering the shared memory 103 locations that are to be updated by the result data values in the transaction's write-set. On the other hand, narrow stripes offer better potential parallelism. Some transactional memory systems enable the stripe width to be dynamically set. Such systems allow coarse-grain locking until sufficient contention is detected; at which time the system switches the coarse-grain lock to a set of fine-grain locks. By automatically splitting the locks and switching to finer grained locking these systems minimize the number of high-latency atomic operations needed to lock low-contention fields while they maximize the potential parallelism for operations that access high-contention fields.

FIG. 2 illustrates a transactional load process 200 as used by the TL family of STMs. When a transaction needs to access data from the transactionally shared data region 113 the transaction invokes the transactional load process 200 through a 'start transactional load' terminal 201. The transactional load process 200 continues to a 'write-set value' decision procedure 203 that determines whether the data value to be loaded is currently stored in the transaction's write-set (for example, the first transaction write-set 119). This can occur if the data value has previously been modified by the transaction and thus is in the write-set awaiting the transaction's commit. If so, the transactional load process 200 continues to a 'load data value from write-set' procedure 205 to load the data value from the transaction's write-set and then the transactional load process 200 completes through an 'end load' terminal 207.

However, if the 'write-set value' decision procedure 203 determines that the data value is not in the write-set, the transactional load process 200 continues to a 'load lock' procedure 209 that accesses the transactional metadata region 115 to examine the lock for the portion of the transactionally shared data region 113 that contains the data value that is to be loaded. Next a 'locked' decision procedure 211 determines whether that data value has been locked by some other transaction. If so, the transactional load process 200 continues to a 'retry or abort' procedure 213 that will either abort the transaction (for example if too much time has passed attempting to acquire the lock), or retry the 'load lock' procedure 209 (possibly after some back-off collision avoidance delay).

However, if the 'locked' decision procedure 211 determines that the data value from the transactionally shared data region 113 is not locked, the transactional load process 200 continues to a 'load data value from shared memory' procedure 215 that loads the data value from the transactionally shared data region 113. In the TL2 implementation of STM, the transactional load process 200 continues to an 'optional lock-validation' procedure 217 that verifies that the version number of the acquired lock is less than the value of the global clock that was read by the transaction when the transaction started (sometimes termed the read-version). If the acquired lock's version number is not valid, the 'optional lock-validation' procedure 217 will abort the transaction. Otherwise the transactional load process 200 continues to a 'record data value and lock in read-set' procedure 219 that records a read-set entry (from the location read from the transactionally shared data region 113) and the version number of its covering lock's version number field in the transaction's read-set. Then the transactional load process 200 completes through the 'end load' terminal 207. The read-set entry contains or references the value of the covering lock's version number field, the location in shared memory of the loaded data value, and can include the loaded data value itself.

In the TL1 implementation of STM, the transactional load process 200 continues directly from the 'load data value from shared memory' procedure 215 to the 'record data value and lock in read-set' procedure 219 for processing and completion as previously described.

The transaction performs its logical-unit-of-work during the speculative execution phase using the data values it has loaded from the transactionally shared data region 113 (the read-set) and generates result data values (tracked by the write-set) that will be exposed in the STM (by either not rolling back changed data values or writing the result data values to their corresponding write locations in the transactionally shared data region 113) to other transactions after the transaction commits.

After the transaction has completed its speculative execution phase it enters its commit phase to commit the results of the speculative execution phase back to the transactionally shared data region 113. During the speculative execution phase the transaction has maintained the write-set that tracks which data values in the transactionally shared data region 113 are to be changed and exposed by the transaction on commit. During the commit phase the TL STM acquires the write-set locks for the portions of the transactionally shared data region 113 that are associated with the write-set and then checks that the previously observed versions of the versioned lockwords kept in the read-set still match the commit-time versions of the versioned lockword (in the transactional metadata region 115) covering the shared locations in the transactionally shared data region 113. The transaction aborts if the read-set versions do not match the transactional metadata region 115 versions at commit-time. If the versions do match the transaction is deemed successful and the commit phase exposes the contents of the write-set to other transactions (for example, by writing the write-set data values to their respective write locations in the transactionally shared data region 113). At the end of the commit phase the transaction increments the version numbers for the versioned lockwords covering the write-set and releases those locks.

FIG. 3 illustrates a TL1 transaction commit process 300 that is used by the TL1 STM to attempt to commit a transaction that has completed its speculative execution phase and has not aborted. The TL1 transaction commit process 300 is invoked by the transaction at a start commit terminal 301 and continues to an 'acquire write-set lock' procedure 303. The 'acquire write-set lock' procedure 303 locates the write locations that are to be updated with data values kept in the transaction's write-set and acquires the locks from the transactional metadata region 115 covering those write locations in the transactionally shared data region 113. Once the locks are acquired, other transactions cannot modify the data values in the transactionally shared data region 113 covered by the locks. Next, the TL1 transaction commit process 300 continues to a 'valid read-set' decision procedure 305 that validates the transaction's read-set by comparing the version numbers of the locks stored in the transaction's read-set with the current version numbers of those locks in the transactional metadata region 115. If the version numbers of the locks stored in the transaction's read-set are different from the current version numbers of those locks in the transactional metadata region 115 (thus, the corresponding data value(s) may have changed), the TL1 transaction commit process 300 continues to an 'abort transaction' procedure 307 that aborts the transaction and then to an 'error exit' terminal 309. The procedure that attempted the transaction can then retry the transaction.

However, if the 'valid read-set' decision procedure 305 successfully validated the transaction's read-set, the TL1 transaction commit process 300 continues to a 'store write-set data to shared memory' procedure 311 that copies the result data values from the transaction's write-set to the appropriate write locations in the transactionally shared data region 113. After the transaction has completed updating the transactionally shared data region 113, an 'increment and release write-set locks' procedure 313 updates the version numbers for the write-set locks (in the transactional metadata region 115) acquired by the 'acquire write-set lock' procedure 303 and releases those locks. Finally, TL1 transaction commit process 300 successfully exits through an 'end commit' terminal 315.

The TL STM just described is vulnerable to "zombie" transactions. Zombie transactions are those that have read an inconsistent set of data values from the transactionally shared data region 113 but have not yet aborted. Zombie transactions can enter infinite loops, generate traps, and otherwise misbehave as a result of attempting to process inconsistent data values from the transactionally shared data region 113 of the shared memory. Zombie transactions are one cause of corruption of buffers that have been isolated by the transaction from the transactionally shared data region 113.

Some of the ways an STM implementation can address zombies (and similar buffer corruption pathways) is by, for example but without limitation, 1) periodically validating the read-set against the transactionally shared data region 113 during the speculative phase; 2) re-validating the current read-set after each transactional load; 3) the use of globally consistent version numbers (for example, as implemented in the TL2 STM), or by 4) using readers-writer locks.

1) Periodic validation of the read-set during the speculative phase is suitable for language-based STMs with managed runtime environments where a just-in-time compiler can emit validation checks, and the runtime can gracefully tolerate traps, and can triage and translate such traps into aborts.

2) Re-validating the current read-set after each transactional load from the transactionally shared data region 113 detects and avoids long term zombie processing. This approach is safe and puts less burden on the compiler and runtime environment but incurs a validation cost quadratic with the size of the read-set.

3) The use of globally consistent version numbers (for example as used in the TL2 STM) avoids zombie execution. Globally consistent version numbers usage efficiently avoids both the potential interconnect scalability issues of readers-writer locks and the quadratic validation latency cost of re-validating after each transactional load. The use of globally consistent version numbers (for example, the optional global clock region 117) is suitable for both managed and unmanaged execution environments.

4) Using readers-writer locks on a per-stripe basis instead of versioned lockwords also prevents zombies. Readers-writer locks provide exclusive write-access to a transaction (the "transactional writer") or concurrent read-access to multiple transactions (the "transactional readers"). If a transactional writer has acquired the readers-writer lock in the writer mode, no transactional readers can acquire the lock. If any transactional readers have acquired the readers-writer lock in the reader mode a transactional writer cannot acquire the lock until all the transactional readers have released the readers-writer lock. During the speculative execution phase of a transaction, the transaction's load operation first acquires a readers-writer lock (using reader mode) covering the location in the transactionally shared data region 113 being loaded and then fetches the data value from the covered location. During the commit phase the transaction acquires the readers-writer locks (using writer mode) for stripes covering the transaction's write-set; releases the previously acquired readers-writer locks (acquired using reader mode); exposes the write-set (for example by storing data from the write-set to the write locations in the transactionally shared data region 113); and releases the readers-writer locks (acquired using writer mode). The readers-writer locks (acquired using reader mode) can be released at commit-time after all the required readers-writer locks (using writer mode) have been acquired. Because the read-set is always consistent validation is never needed and there are never any instances of zombie execution.

Readers-writer locks can be implemented as a versioned lockword that includes a readers-count field and a write-lock bit. Readers-writer locks are operated upon with atomic instructions such as CAS. The readers-writer locks operate under the following rules: the readers-writer lock can be acquired using writer mode only when the readers-count is zero and the write-lock bit is clear; a readers-writer lock can be acquired in reader mode (but only when the write-lock bit is clear) by incrementing the readers-count field. One skilled in the art of shared memory multi-processor systems will understand the performance and synchronization issues associated with atomic memory operations, cache lines, etc. One skilled in the art will understand that incrementing the readers-count field means changing the value in the readers-count field by an amount and that decrementing the readers-count field means changing the value of the readers-count field by an amount inverse to the amount (generally, the adjustment logic used to change the value of the readers-count field by an amount can increment the readers-count field and the adjustment logic used to change the value of the readers-count field by the inverse of the amount can decrement the readers-count field).

To avoid the situation where a set of transactional readers starve or impede one or more transactional writers by keeping the readers-count continuously above zero, a readers-writer lock implementation can allow a contending transactional writer to request that transactional readers desist (such that the transactional readers cannot acquire the readers-writer lock in reader mode) and "drain". Once the readers-count reaches zero the transactional writer has an opportunity to acquire the readers-writer lock in writer mode. This prevents indefinite transactional writer starvation. Readers-writer locks with this capability generally include a drain flag which, when set by a potentially starving transactional writer, requests that subsequently arriving transactional readers—transactional readers that intend to acquire readers-writer lock using reader mode—stall, and defer incrementing the readers-count until either (a) that count reaches zero, meaning that transactional writers had a fair chance to contend for the readers-writer lock, or (b) until some transactional writer acquires the readers-writer lock and clears the drain flag. In a readers-writer lock the drain flag is often stored in a single-bit drain field.

Another way to avoid the situation where a set of transactional readers starve or impede one or more transactional writers (by keeping the readers-count continuously above zero) is to implement a protocol where a single transactional writer can atomically set the write-bit (thus acquiring the write-lock) even though the readers-count is non-zero. The transactional writer, having acquired the exclusive write-lock, cannot proceed until it observes that the readers-count is zero. Transactional readers that arrive subsequent to the transactional writer having set the write-lock bit must stall, waiting for the write-bit to become clear before they atomically increment the readers-count field and proceed. Yet another technology that can be used to avoid this situation is to use a read-indicator. A read-indicator maintains state (for example, "some" or "none") as to whether any readers exist. A read-indicator is in use if some transaction is using it and free if no transaction is using it. A read-indicator can be implemented using a reader counter or a SNZI-like read-indicator, which is subsequently described and is more scalable than a reader counter because it requires less mutation of shared data and thus less coherence traffic on SMP systems.

FIG. 4 illustrates a TL2 transaction commit process 400 that is used by the TL2 STM to attempt to commit a transaction that has completed its speculative execution phase and has not aborted. The TL2 transaction commit process 400 is invoked by the transaction at a start commit terminal 401 and continues to a 'lock write-set' procedure 403. The 'lock write-set' procedure 403 locates the locations in the transactionally shared data region 113 that are to be updated with data values kept in the transaction's write-set and acquires the locks covering those locations. Once the locks are acquired, other transactions cannot modify the data values in the transactionally shared data region 113 covered by the locks.

Once the write-set locks are acquired, the TL2 transaction commit process 400 continues to an 'advance global clock' procedure 405 that atomically fetches the value of and then increments the optional global clock region 117. The fetched value of the global clock is the value that will be used as the write-version when the write-set locks are released as is subsequently described.

Next, the TL2 transaction commit process 400 continues to a 'verify read-set' decision procedure 407 that validates the transaction's read-set by verifying that the version numbers for the locks in the transaction's read-set are consistent with the value of the global clock when the transaction started (the read-version). The 'verify read-set' decision procedure 407 can use techniques similar to those previously described with respect to FIG. 2. If the transaction's read-set is not valid, the TL2 transaction commit process 400 continues to an 'abort transaction' procedure 409 that aborts the transaction and then to an 'error exit' terminal 411. The procedure that attempted the transaction can then retry the transaction.

However, if the 'verify read-set' decision procedure 407 successfully validated the transaction's read-set, the TL2 transaction commit process 400 continues to an 'store write-set data to shared memory' procedure 413 that copies the data values from the transaction's write-set to the corresponding write locations in the transactionally shared data region 113. After the transaction has completed updating the transactionally shared data region 113, an 'update and release write-set locks' procedure 415 updates the version numbers for the locks acquired by the 'lock write-set' procedure 403 with the write-version value obtained by the 'advance global clock' procedure 405 and releases those locks. Finally, the TL2 transaction commit process 400 successfully exits through an end commit terminal 417.

The previous descriptions have provided sufficient information needed to allow one skilled in the art to implement the TL Family of STMs without undue experimentation. Supplemental information about the TL Family of STMs is listed in the Cross Reference to Related Applications Section herein.

There are situations where a programmer of one transaction would find it useful to isolate a memory buffer with the intent of making the memory buffer inaccessible to other transactions so that the one transaction can access the buffer without using the transaction protocol (for example, a transaction-related process could unlink a buffer from a transactionally maintained concurrent list so that the thread can use the buffer as normal memory available to the thread's processor even though the memory underlying the buffer is shared memory) or to release the memory underlying the buffer for reallocation. However, note that even though the buffer cannot be accessed by any other transaction (executing on the same or other processor) AFTER the transaction-related process that isolates the buffer commits, prior to the commit, latent transactional stores that might be pending or executed by previous transactions that accessed the buffer before it was isolated can still write into the shared memory buffer that was intended to be isolated. This unexpected behavior is known as the "privatization problem." This problem manifests by having a latent transaction overwriting a portion of shared memory that underlies a buffer that has been isolated (removed) from the transactionally shared data region 113. This results in unexpected changes to the contents of the isolated shared memory (which may have been reallocated and (although resident in the shared memory)) is intended to be outside of the transactionally shared data region 113. Other unexpected, generally asynchronous, behaviors can also occur.

In STM designs that use the "update-in-place" policy, such transactional stores may be executed by zombie transactions (that accessed the buffer before it was isolated but haven't yet found that they were aborted by the isolating transaction—and when they do, roll back the data values in the buffer). In STM designs with the "speculative store buffer policy", all stores are deferred until after the transaction has committed successfully, so such stores can be executed only by transactions that committed before the isolating transaction did. Thus, when a transaction isolates a memory region from a transactional data structure and that region is subsequently accessed non-transactionally (that is, the region "escapes" the transactional domain), latent transactional stores pending to the region can corrupt the isolated memory region.

For example, consider the following scenario: assume transactions tx1 and tx2 operate concurrently under TL2; assume that tx2 is the isolating transaction; assume tx1 is a transaction that writes to the isolated buffer; and assume tx1/tx2 interleave as shown in Table 1.

TABLE 1

A is initially non-null
tx1: { A->Field=3; }
tx2: { tmp=A; A=new; } free (tmp)

| tx1 | tx2 |
|---|---|
| Start | Start |
| TXLD A | TXLD A; tmp=A |
| TXST A->Field=3 | TXST A=new |
| Commit | |
|   Lock A->Field | |
|   Validate A | |
|   ... | |
| | Commit |
| |   Lock A |
| |   Validate A |
| |   ST A=new |
| | Done |
| | free (tmp) |
| ST A->Field=3 [!] | |

Note that time increases from the start to the last line. Also note that the store by tx1 "ST A→Field=3" constitutes a use-after-free error as the tx2 expects tmp to be isolated from the transactional system at the time of the free and thus unchanged by other transactions. To avoid unexpected behaviors like the privatization problem, most STM designs (including those of the TL family previously described) do not allow concurrent transactional and non-transactional access to the same set of shared memory locations. Note, for subsequent discussion, we continue to use tx2 as the isolating transaction, and tx1 as the transaction that writes to the isolated buffer.

STMs are vulnerable to these types of unexpected behaviors whenever one non-aborting transaction tx1 reads a location "A" that some other non-aborting transaction tx2 subsequently modifies, and, within the same transaction, tx1 subsequently writes to other location(s) data value(s) that is dependent on the data value loaded from "A", and tx2 returns before all tx1's commit-time stores have completed. Critically, tx2's write-set intersects tx1's read-set, but the timing was such that tx1 committed before tx2 and thus neither aborted despite the seeming conflict.

To provide privatization capability to a transactional memory, the transactional memory can employ either "explicit privatization", where the programmer explicitly designates regions passing out of transactional use to be quiesced, waiting for any pending transactional stores to complete before the memory is allowed to be accessed non-transactionally, or "implicit privatization", where the STM automatically manages such lifecycle issues. "*Code Generation and Optimization for Transactional Memory Constructs in an Unmanaged Language,*" by Cheng et al., CGO 2007, describes an implicit privatization mechanism that quiesces threads instead of shared memory regions, potentially impacting overall scalability.

Programming explicit buffer quiescence (for example programming explicit privatization) is complex and error prone. For example, it is insufficient for a transaction to explicitly privatize a buffer from the transactionally shared data region 113 before modifying that buffer. For example, assuming two variables VShared and V, the following demonstrates the problem.

---

Thread 1: Transaction T1 { if (VShared) V=7; }
Thread 2: Transaction T2 { VShared=False; };
operate on V non-transactionally

--- where if T1 and T2 interleave execution such that after T1 reads Vshared but before it assigns the value seven to V, T2's operation on V can be overwritten by T1 when it resumes. Another problematic situation is if a location from the transactional metadata region 115 is passed to a legacy library routine that is not transactional memory aware (and thus the library routine will assume that the data value in the location is not externally modified and will use non-transactional loads and stores to accesses the location). This will result in inconsistent operation of the library routine as sometimes the data value of the location will be externally modified unexpectedly.

It would be advantageous to use transactional memory processes that do not have the previously described problems.

DETAILED DESCRIPTION

The technology described herein teaches methods for committing a transaction to a shared memory. The shared memory is in communication with one or more processors that are executing a plurality of threads. Each of the one or more processors have the capability to operate a lock in the shared memory. The transaction includes a read-set and a write-set. The read-set identifies a first read location of the shared memory. The first read location is covered by a first lock object. The write-set identifies a result data value that will be stored at a first write location of the shared memory. The first write location is covered by a second lock object. One method can be used when the first lock object and the second lock object each have a reader mode and a writer mode. This method acquires the first lock object using the reader mode and also acquires the second lock object using the writer mode. Once the second lock object is acquired the method stores the result data value at the first write location in the shared memory. Once the result data value is stored the method releases the second lock object and the first lock object. Another method can be used when the first lock object and the second lock object each include a writer lock and the first read location is covered by a first indicator and the first write location is covered by a second indicator. This method acquires the writer lock of the second lock object and then the transaction arrives at the first indicator. Once the transaction has arrived at the first indicator, the first read-set entry is validated against a commit-time data value of the first read location in the shared memory. Next, the result data value is stored at the first write location in the shared memory and then the writer lock is released. Once the writer lock is released the transaction departs from the first indicator and the method waits for the second indicator to drain. The disclosed technology also teaches apparatus that perform the methods and program products that contain computer instructions that cause a computer to perform the methods when the computer executes the instructions.

Figure 1:
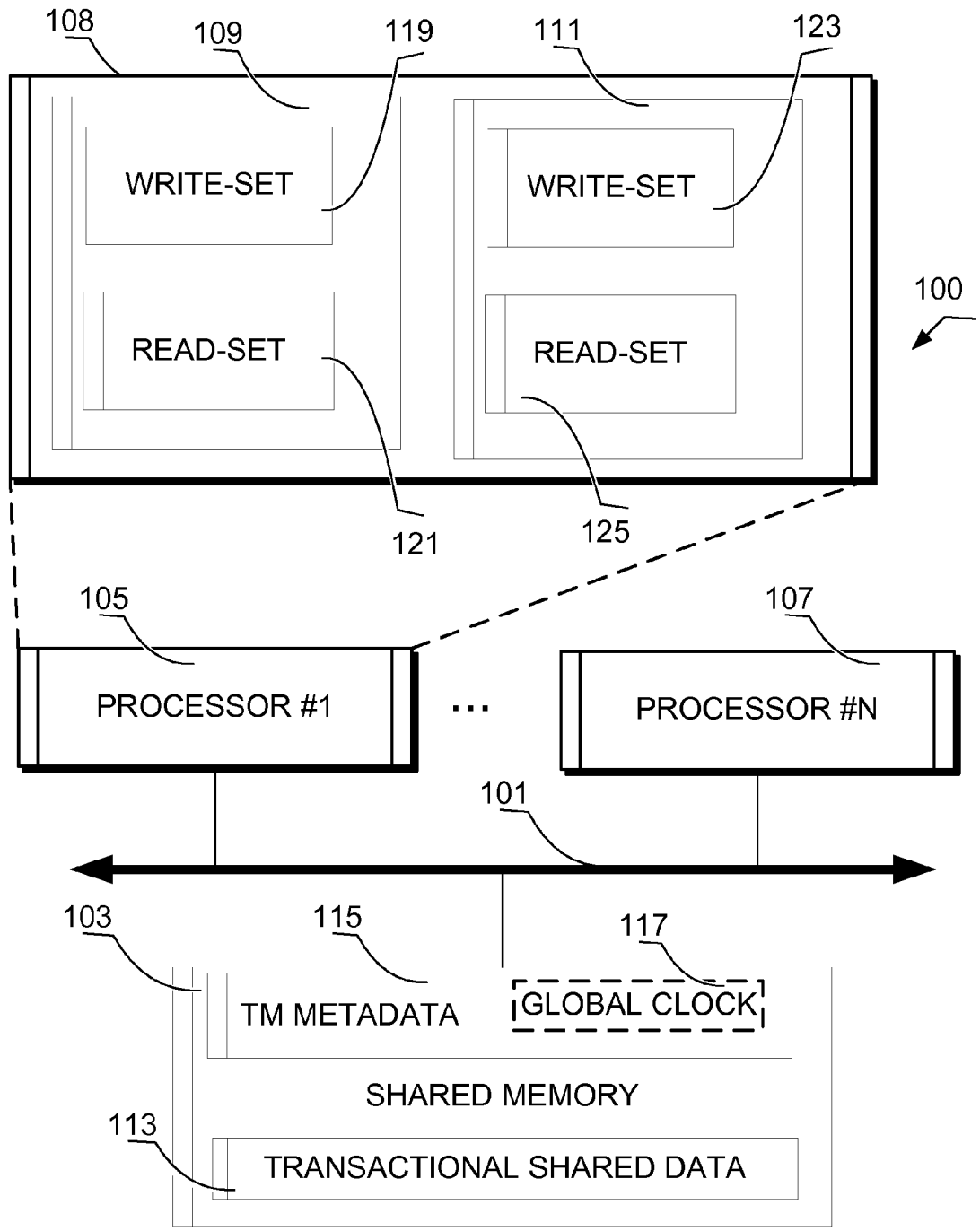
FIG. 1 illustrates a prior art multi-processor, shared memory system.
Figure 2:
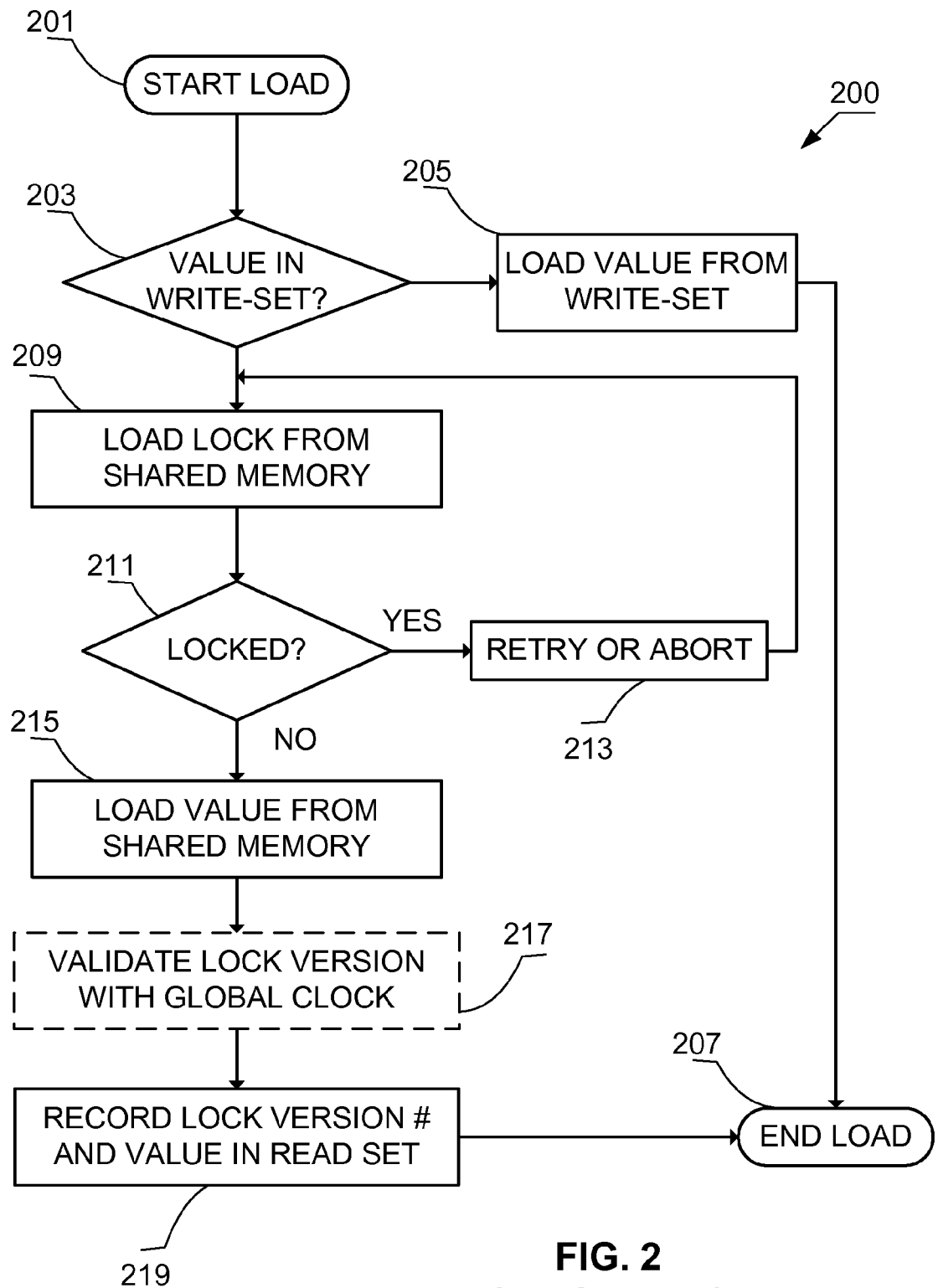
FIG. 2 illustrates a prior art transactional load process.
Figure 3:
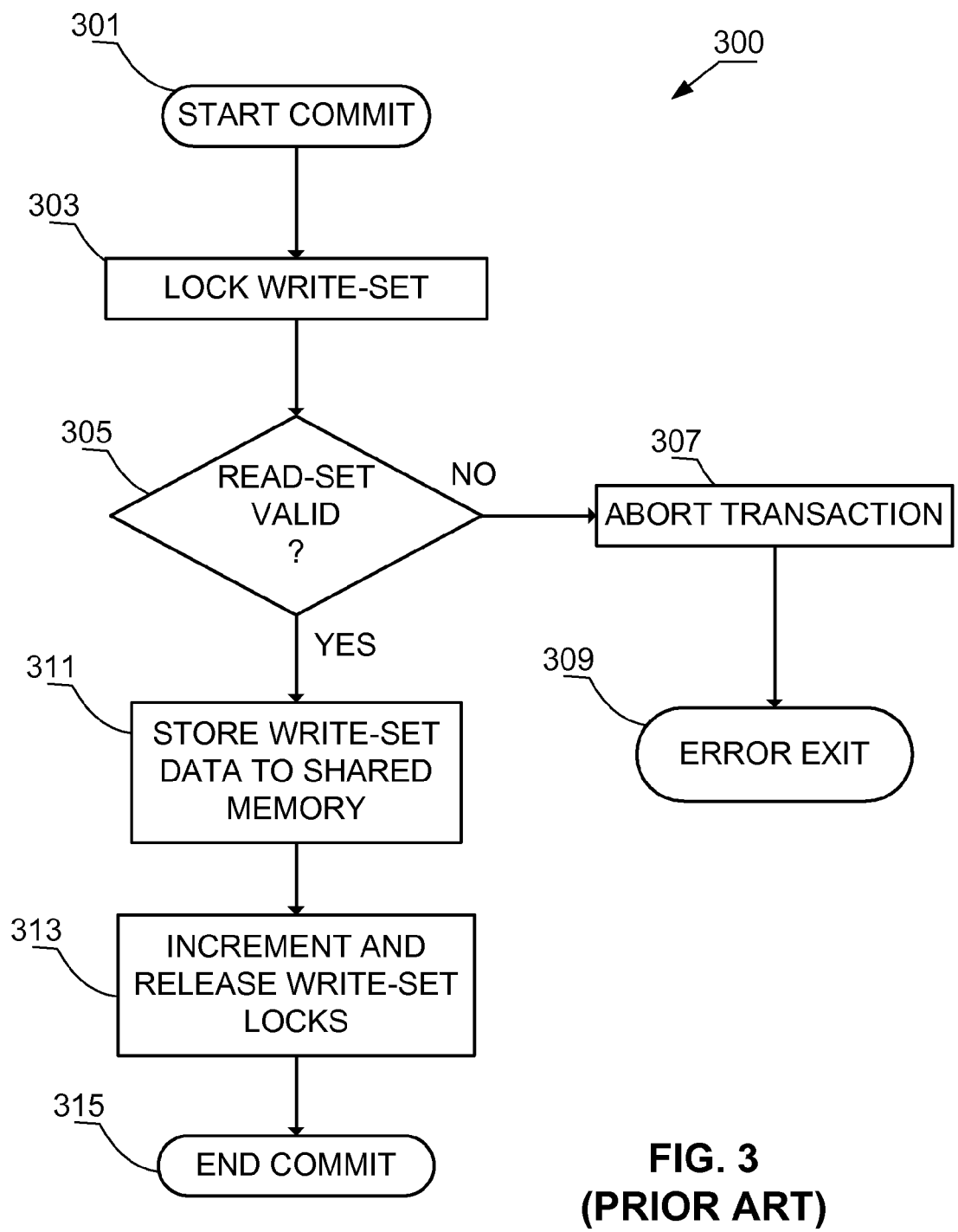
FIG. 3 illustrates a prior art TL1 transaction commit process.
Figure 4:
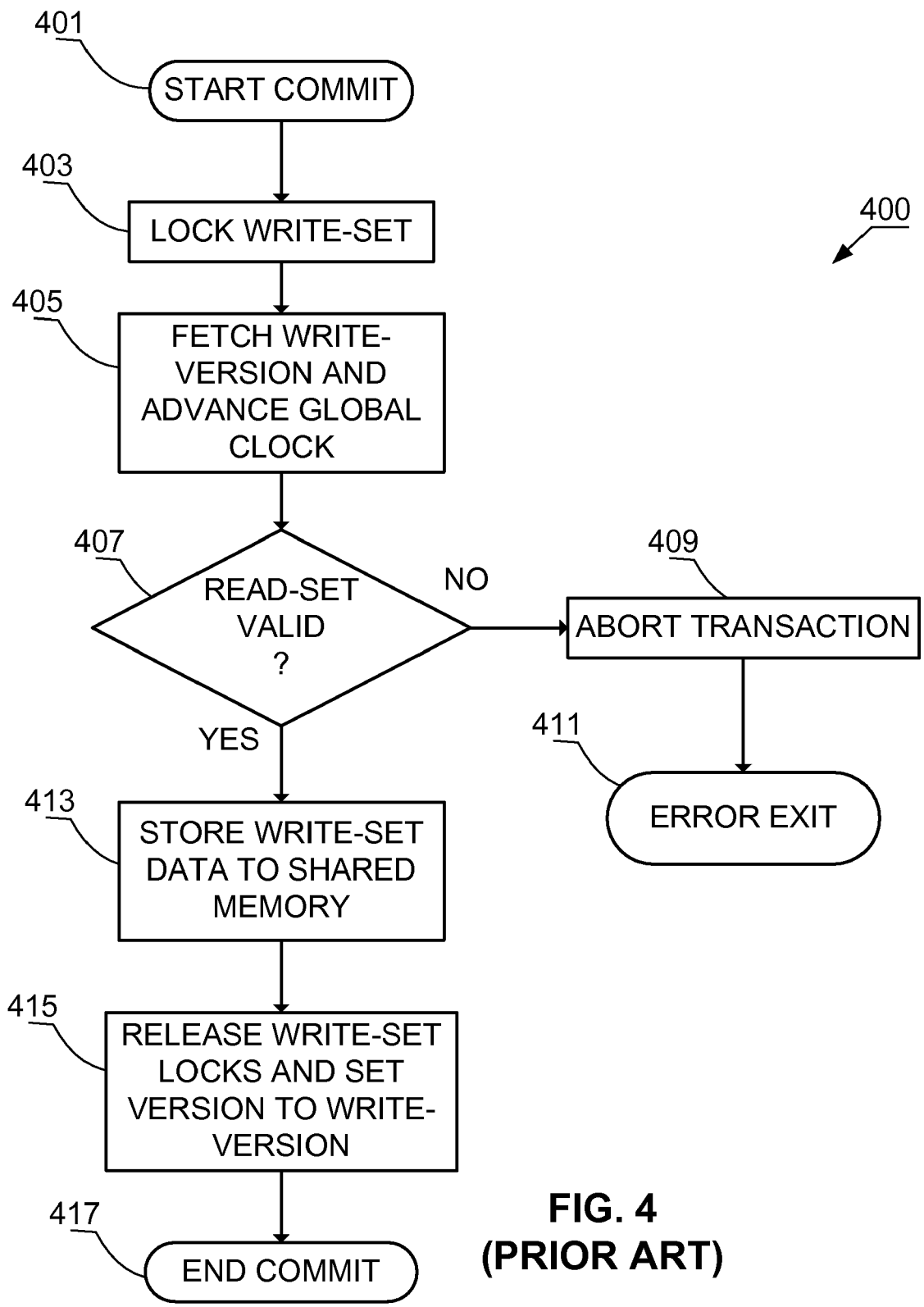
FIG. 4 illustrates a prior art TL2 transaction commit process.
Figure 5:
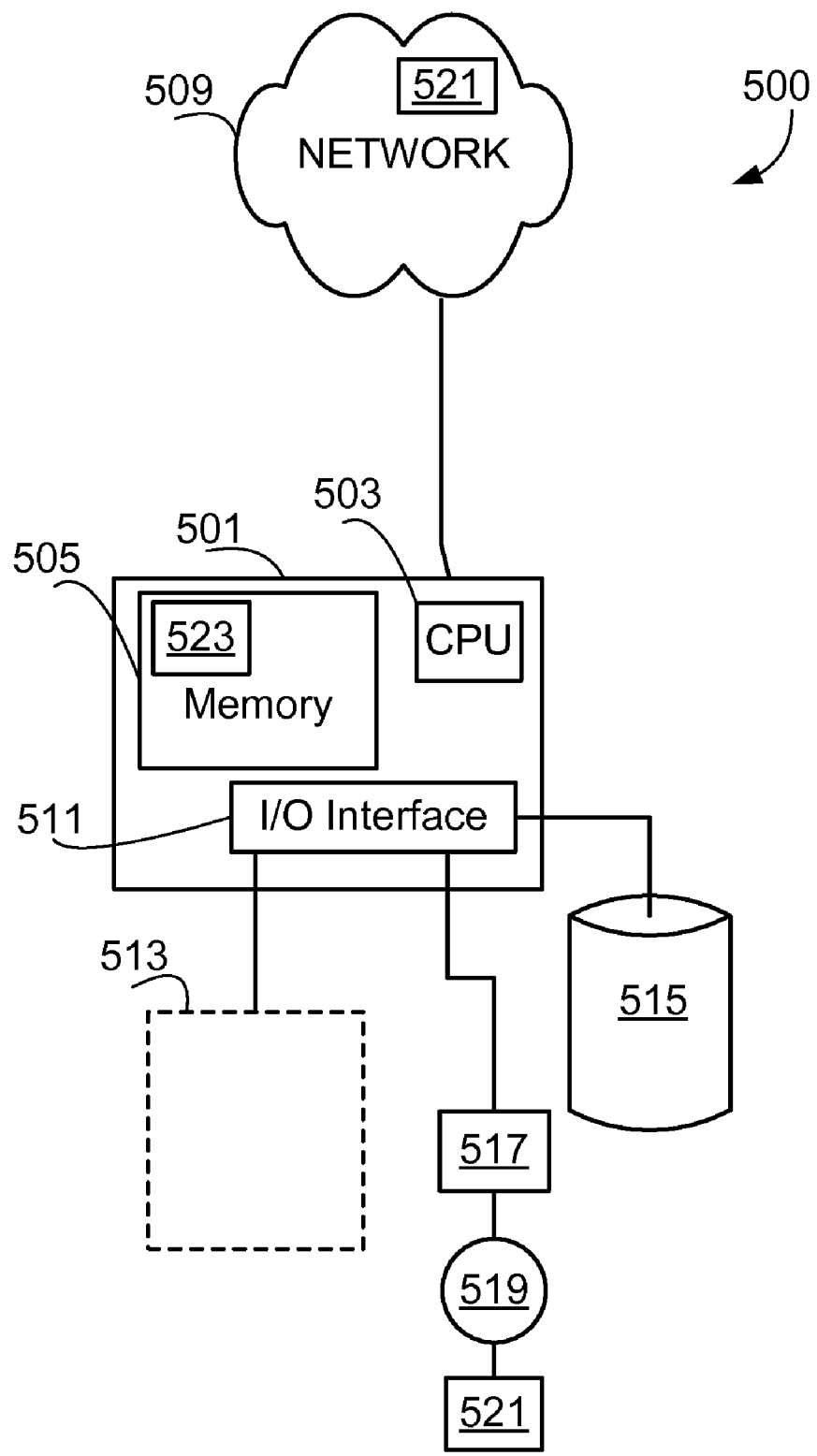
FIG. 5 illustrates a multi-processor, shared memory computer system that can incorporate the technology disclosed herein.

FIG. 5 illustrates a computer system 500 that can incorporate the technology described herein. The computer system 500 includes a computer 501 that incorporates a multi core CPU 503, a shared memory 505 that can be accessed by each of the processors in the multi core CPU 503, and a network interface (not shown). The network interface provides the computer 501 with access to a network 509. The shared memory 505 can be any technology that enables multiple processors to interleave read and write accesses to the memory. It is random access in the sense that any piece of data can be returned in constant time, regardless of the data's physical location and whether or not the returned data is related to the previous piece of data. Such memory can be Core, SRAM, DRAM, EPROM, EEPROM, NOR FLASH, etc. The computer 501 also includes an I/O interface 511 that can be connected to an optional user interface device(s) 513, a storage system 515, and a removable data device 517. The removable data device 517 can read a computer-usable data carrier 519 (such as a fixed or replaceable ROM within the removable data device 517 itself (not shown); as well as a computer-usable data carrier that can be inserted into the removable data device 517 itself (such as a memory stick, CD, floppy, DVD or any other tangible media) that typically contains a program product 521. The user interface device(s) 513 can include a display device(s) and user input devices (not shown). The storage system 515 (along with the removable data device 517), the computer-usable data carrier 519, and (in some cases the network 509) comprise a file storage mechanism. The program product 521 on the computer-usable data carrier 519 can be read into the shared memory 505 or non-shared memory as a program 523 which instructs the multi core CPU 503 to perform specified operations. In addition, the program product 521 can be provided from devices accessed using the network 509. One skilled in the art will understand that the network propagates information (such as data that defines a computer program). Signals can be propagated using electromagnetic signals, visible or invisible light pulses, signals on a data bus, or signals transmitted over any wire, wireless, or optical fiber technology that allows information to be propagated from one point to another. Programs and data are commonly read from both tangible physical media (such as those listed above) and from the network 509. Thus, the network 509, like a tangible physical media, can be a computer-usable data carrier. One skilled in the art will understand that not all of the displayed features of the computer 501 need to be present for all embodiments that implement the techniques disclosed herein. In addition such a one will understand that the technology disclosed herein will also apply to SMP systems where the processors are separate so long as the processors are in communication with, and share access to, the shared memory 505. Further, one skilled in the art will understand that computers are ubiquitous within modern devices ranging from as cell phones to vehicles to kitchen appliances etc.

The computer system 500 is but one example where transactional memory can be used. Other examples include massive multiprocessor systems that can have processor dedicated memory and at least one shared memory that is tightly coupled between some or all of the processors in the massive multiprocessor system.

The TL family of STMs, as known to one skilled in the art and previously described, provides only explicit buffer quiescence. The technology disclosed herein teaches how to provide implicit buffer quiescence (and thus implicit privatization). The technology disclosed herein is presented in the context of the TL family of STMs. However, one skilled in the art would be able to implement this implicit buffer quiescence technology in many other transactional memory embodiments without undue experimentation.

The inventors have realized that given transactions tx1 and tx2 that operate concurrently, where at least one of the transactions is a software transaction, where tx2's write-set intersects tx1's read-set, and, assuming but not limited to a TL2-like algorithm, if tx1's read-set validation succeeds before tx2's write-set lock acquisition completes, then any of the following are sufficient to provide implicit buffer quiescence: 1) tx1 aborts, 2) tx2 aborts, or 3) tx2 delays returning control from its commit until tx1's commit-time stores have completed.

Note that if transaction tx1 executes transactional writes into a buffer (in shared memory) that was isolated by isolating transaction tx2, then tx1 and tx2 must be conflicting—in particular, the isolating transaction tx2 must have modified some memory location(s) in order to correctly isolate the buffer, and tx1 must have read this/these location (s) before they were modified by tx2.

Therefore, to provide implicit buffer quiescence, it suffices if any transaction TX (upon successful commit) waits for (does not return until) transactions that have read locations written by TX to finish their transactional writes. In particular, in STM implementations where a transaction only executes memory store operations to the shared memory after it has successfully committed (such as the TL STM family), transaction TX only need wait for conflicting transactions that have already committed but have not yet finished copying their write-set back to the corresponding write locations in shared memory. The subsequently described "readers-writer lock" and "read indicator" technologies provide implicit buffer quiescence to such STM implementations. Thus, these technologies prevent latent transactional writes to a buffer from interleaving with non-transactional read and writes that may take place after that buffer is privatized.

The use of readers-writer locks can guarantee that the isolating transaction tx2 delays returning control from its commit operation until tx1's commit-time memory store operations are completed, by having tx1 hold locks on all readers-writer locks (acquired using reader mode) that cover tx1's read-set while performing its commit-time memory store operations. Since tx1's read-set must have at least one readers-writer lock in common with tx2's write-set, tx2 cannot finish and return from its commit operation before tx1 releases the readers-writer locks (acquired using reader mode). When using readers-writer locks (as previously described in the background with respect to zombie prevention using readers-writer locks) this can be achieved by having the commit operator hold the readers-writer locks (acquired using reader mode) until the speculative write-back is completed. One skilled in the art will understand that simple mutual-exclusion locks (a degenerate case of readers-writer locks) can also be used at the cost of restricting the potential parallelism as compared to the use of readers-writer locks.

Figure 6:
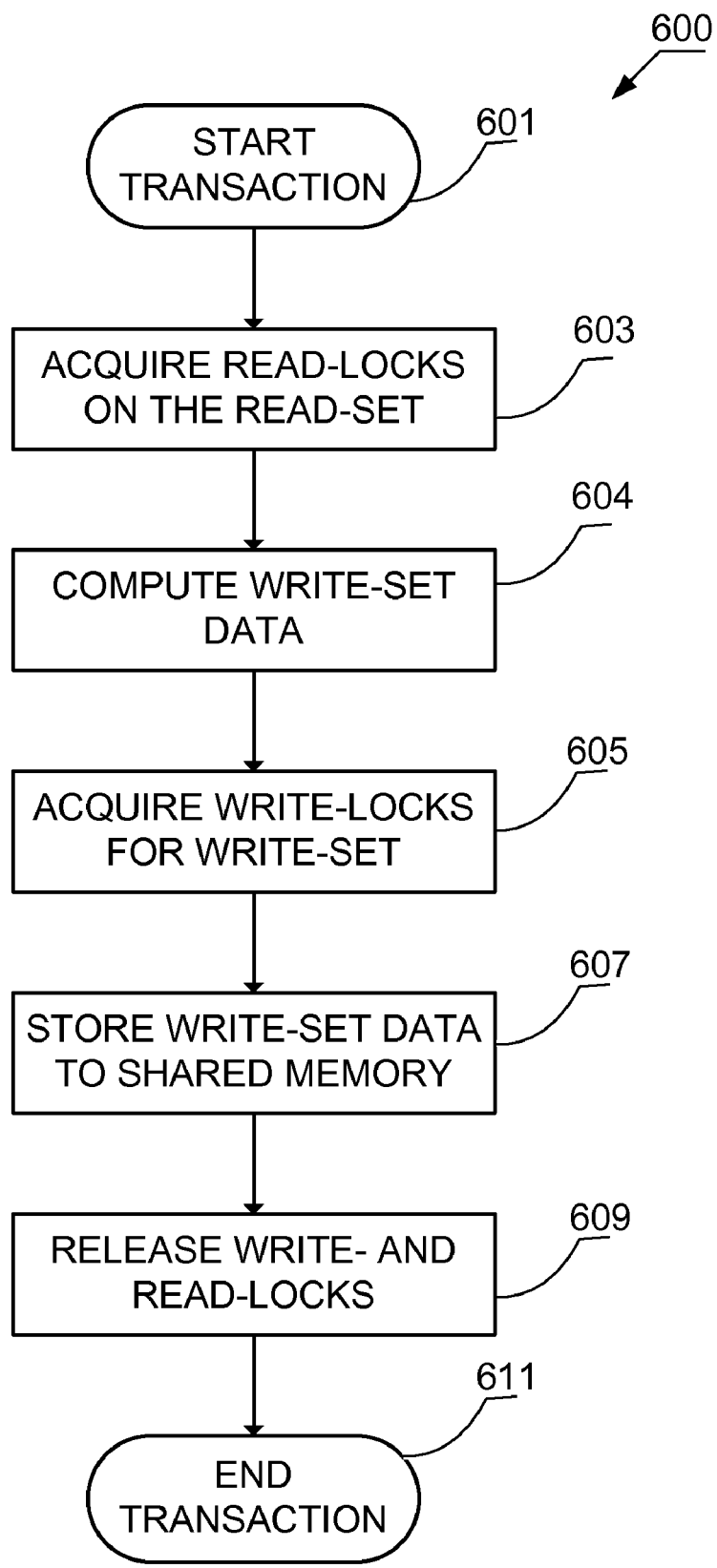
FIG. 6 illustrates a transaction process that uses readers-writer locks.

FIG. 6 illustrates a transaction process 600 that has the implicit buffer quiescence characteristic. It initiates at a 'start transaction' terminal 601 and continues to an 'acquire read-set locks' procedure 603 that acquires the readers-writer locks (using reader mode) needed to cover every location in the transactionally shared data region 113 that corresponds to the transaction's read-set. Once the reader-locks are acquired, a 'compute write-set' procedure 604 generates write-set data value(s) that will be stored in the write locations in the transactionally shared data region 113. Next an 'acquire write-locks' procedure 605 acquires the readers-writer locks (using writer mode) covering the transaction's write-set. Next a 'store write-set data to shared memory' procedure 607 writes the speculative data values in the transaction's write-set to the write locations in the transactionally shared data region 113. Next a 'release write- and read-locks' terminal 609 releases the locks that were acquired by both the 'acquire read-set locks' procedure 603 and the 'acquire write-locks' procedure 605, and the transaction process 600 completes through an 'end transaction' terminal 611. One skilled in the art will understand that the 'acquire read-set locks' procedure 603 and the 'compute write-set' procedure 604 generally are not sequential (although drawn sequentially to simplify the presentation of the concept), as the computation of the write-set data can load data values from the transactionally shared data region 113 and add corresponding read-set entries to the read-set as needed during the computations.

Once the transaction completes, any buffer freed from the transactionally shared data region 113 by the transaction will be isolated from the transactional system until a transaction subsequently re-allocates the released portion of the shared memory.

Another implicit buffer quiescence implementation incorporates readers-writer lock capability into the TL1/TL2 versioned write-locks (a versioned readers-writer lock), this implementation, unlike the one shown in FIG. 6, defers acquisition of the readers-writer lock until commit time. The resultant versioned lockword contains a version number field, a small saturating reader-count field, a write-lock field and optionally a drain field. In some implementations the number of bits dedicated to the reader-count can be rather small. In such implementations transactional readers attempting to increment the reader-count beyond its limit would either abort or stall until the reader-count dropped below the maximum value. The speculative execution phase is the same as previously described for the TL family while the commit operator is modified as is subsequently described with respect to FIG. 7.

Figure 7:
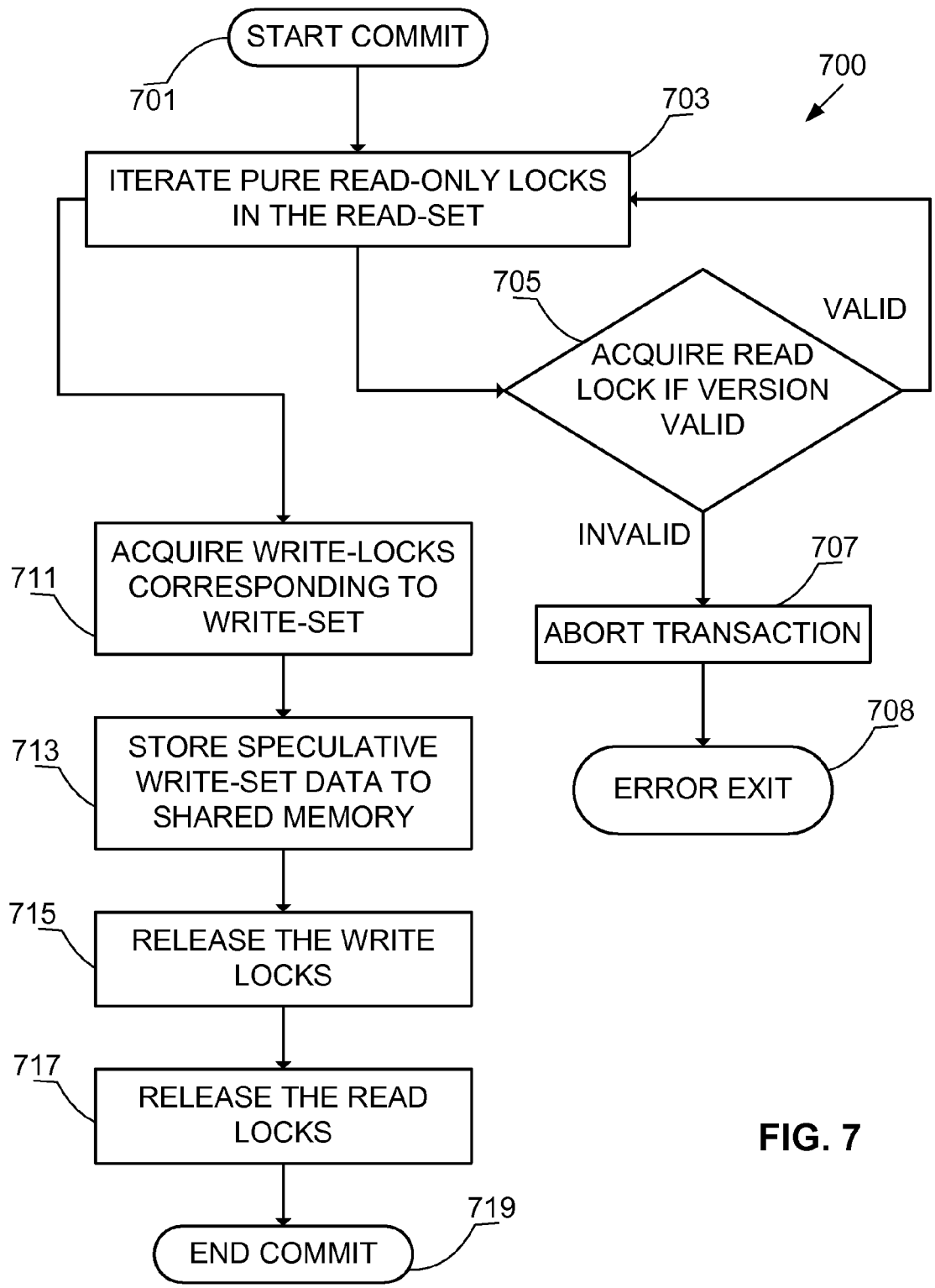
FIG. 7 illustrates a STM commit process that uses readers-writer locks.

FIG. 7 illustrates a STM readers-writer lock commit process 700 that provides implicit buffer quiescence, that initiates at a 'start commit' terminal 701 and then continues to an 'iterate over pure read-only read-set locks' procedure 703. The 'iterate over pure read-only read-set locks' procedure 703 iterates over each of the pure read-only versioned readers-writer locks for the data values corresponding to the read-set entries in the read-set. A pure read-only versioned readers-writer lock is one that covers one or more locations in the transactionally shared data region 113 that correspond to the transaction's read-set and also does not cover any of the locations in the transactionally shared data region 113 that correspond to the transaction's write-set. For each of the iterated versioned readers-writer locks, a 'validate and acquire lock' procedure 705 atomically validates each lock's version and acquires the versioned readers-writer lock using reader mode if the version is valid. If any of the locks are not valid then the read-set is not valid and the STM readers-writer lock commit process 700 continues to an 'abort transaction' procedure 707 that aborts the transaction. Then the STM readers-writer lock commit process 700 continues to an 'error exit' terminal 708 to signal the invoking procedure to abandon or retry the transaction.

However, if the 'validate and acquire lock' procedure 705 determines that the iterated versioned readers-writer lock has a valid version number, the STM readers-writer lock commit process 700 loops back to the 'iterate over pure read-only read-set locks' procedure 703. Thus, at completion of the 'iterate over pure read-only read-set locks' procedure 703 all of the pure read-only locks for the locations in the transactionally shared data region 113 have been acquired such that other transactions cannot modify the corresponding data values in the transactionally shared data region 113.

After all the pure read-only read-set locks have been iterated, the STM readers-writer lock commit process 700 continues to an 'acquire write-related locks for the write-set' procedure 711. The 'acquire write-related locks for the write-set' procedure 711 acquires the versioned readers-writer locks (using writer mode) that are needed to cover the write locations of the transactionally shared data region 113 to which the transaction will store data values from its write-set.

Once the appropriate versioned readers-writer locks are acquired using writer mode, a 'store write-set data to shared memory' procedure 713 stores the data values from the transaction's write-set to the write locations of the transactionally shared data region 113. Next, a 'release write-related locks' procedure 715 releases the versioned readers-writer locks acquired using writer mode by the 'acquire write-related locks for the write-set' procedure 711. Then a 'release read-related locks' procedure 717 releases the versioned readers-writer locks acquired using reader mode by the 'validate and acquire lock' procedure 705. The STM readers-writer lock commit process 700 then successfully completes through an 'end commit' terminal 719.

In some embodiments, the 'acquire write-related locks for the write-set' procedure 711 can occur prior to the 'validate and acquire lock' procedure 705 (and the iteration). However, the sequence shown in the STM readers-writer lock commit process 700 will hold the versioned readers-writer lock acquired using writer mode for a shorter period of time, which is desirable for scalability. Once the transaction completes, any buffer freed from the transactionally shared data region 113 will be isolated from the transactional system until a transaction subsequently re-allocates the released portion of the shared memory.

While the readers-writer lock-based solutions guarantee that the commit operation of tx2 will not return before tx1 finishes storing its write-set to the write locations of the transactionally shared data region 113 and releases the readers-writer locks (acquired using reader mode), these solutions can also limit potential parallelism because tx2 cannot begin its commit-time store before tx1 releases the readers-writer locks it acquired using reader mode. A more general and less restrictive way to delay tx2's commit operation can be accomplished by using read-indicators (RI).

A read-indicator indicates whether any transactions are in the progress of reading a location. The read-indicator can include an additional drain field that can be used to prevent new transactional readers from incrementing the read-indicator. The read-indicators can be collocated with (for example, embedded in) versioned write-locks. Alternatively the read-indicators can reside in a distinct array and use a different variable-to-read-indicator mapping than the one used to map locations in the transactionally shared data region 113 to locks (to illustrate, one simple embodiment can use a single global read-indicator, although such an embodiment would limit scalability).

As previously mentioned, frequent modifications of a read-indicator can significantly impede scalability (especially on traditional SMP computers). A "Scalable Non-Zero Indicator" (SNZI) object can be used instead of a counting read-indicator. A SNZI object supports scalable Arrive, Depart, and Query operations, where the Query operation simply reports whether there is any transaction that has arrived and not yet departed. Using a SNZI object will not allow seeing precisely how many transactions are reading a data value covered by the SNZI object but will allow a transaction to arrive, depart, and query a SNZI object and thus provide the essential functionality that is provided by a read-indicator. The SNZI mechanism specifically targets implementations in which the Query operation comprises a single read of a variable that will not change before the number of transactions that have arrived and not yet departed becomes zero or becomes non-zero. Thus, using a SNZI object (instead of the counter in a read-indicator) can reduce contention for the shared memory and thus improve scalability. Some SNZI objects can include a drain field for use as previously described. The term "indicator" as used herein covers a read-indicator, a SNZI object or any similar technology that indicates that a portion of memory covered by the indicator is in use. Where "indicator" is used, "arrive" (arriving at) means arrive in the SNZI sense when applied to an SNZI object, when used in the read-indicator sense, "arrive" means increasing the read-indicator, "depart" (departing from) has the expected meanings, and "query" (querying) means query the SNZI object or read the value of the read-indicator. One skilled in the art will understand that note that a degenerate example of a read-indicator is a counter in shared memory wherein the "arrive" operation atomically increments the counter, "depart" atomically decrements the counter, and "query" simply fetches the counter.

Figure 8:
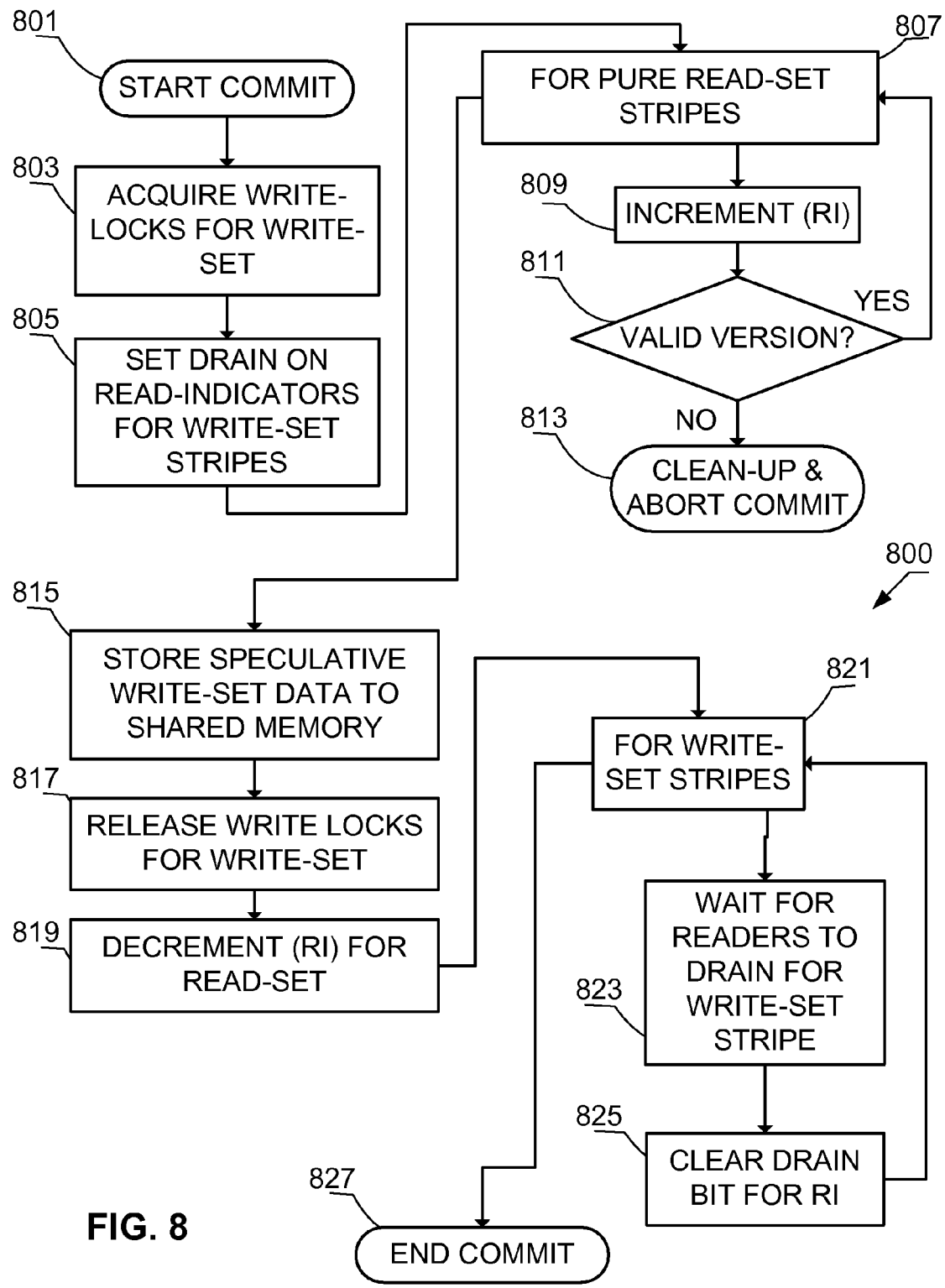
FIG. 8 illustrates a STM commit process that uses read-indicators.

FIG. 8 illustrates a read-indicator STM commit process 800 where each stripe is covered by a read-indicator. The read-indicator STM commit process 800 is invoked when a transaction is ready to commit, initiates at a 'start commit' terminal 801 and continues to an 'acquire write-locks for the write-set' procedure 803. The 'acquire write-locks for the write-set' procedure 803 acquires the locks covering the locations in the transactionally shared data region 113 that correspond to the data values that are to be changed, which are in the transaction's write-set as has been previously discussed. Once these locks are acquired, a 'set read-indicators to drain' procedure 805 sets each read-indicator (that is associated with the stripes covering the transaction's write-set) to drain. This causes transactions that attempt to load data values from portions of the transactionally shared data region 113 that are covered by the read-indicator to stall and/or abort. In implementations that use SNZI objects the 'set read-indicators to drain' procedure 805 can set the SNZI object to drain (such that the SNZI object will not allow arrivals by other transactions).

At this point, no other transaction can acquire write access to the data values in the transactionally shared data region 113 that are going to be changed by this transaction. In addition, other transactions that have not yet attempted to load data values that are going to be changed by this transaction are prohibited from loading data values and these other transactions will either stall and/or abort. Transactions that have already loaded data values that are going to be changed will continue to execute based on their individual read-sets but will eventually abort (if they have not already validated their read-set during the commit phase). Note that transactions that have validated their read-set during the commit phase but that have not yet completed their stores to the transactionally shared data region 113 are those that will successfully commit and that can change values in a buffer that was removed from the transactionally shared data region 113 by the current transaction. Such a transaction has incremented the read-indicators for the locations covering its write-set, and has not yet decremented them. Thus, this transaction will wait until all such transactions have decremented their read-indicator(s) (which means that this transaction will not return until after all such transactions have completed their stores).

The read-indicator STM commit process 800 continues to an 'iterate pure read-set stripes' procedure 807 that iterates each pure read-set stripe. A pure read-set stripe is a stripe that covers at least one of the data values in the transactionally shared data region 113 corresponding to a read-set entry has been loaded into the transaction's read-set and for which that stripe does not contain any locations contained in the transaction's write-set. For each of the pure read-set stripes an 'increment read-indicator' procedure 809 determines whether the read-indicator is being drained, and if not increments the read-indicator. If the read-indicator is being drained, the transaction can stall and/or abort. Once the read-indicator is incremented, a 'valid data value' decision procedure 811 validates the data values corresponding to the read-set entries in the transaction's read-set with the corresponding commit-time data values in the pure read-set stripe. For example, the 'valid data value' decision procedure 811 can validate the data value in the transaction's read-set by comparing a first value of the lock object's version number (the lock covering the location of data value that was stored (within a read-set entry) in the transaction's read-set) with that lock's version number at the time of the commit from the transactional metadata region 115 (a subsequent value of that lock's version number). If any of the data values in the transaction's read-set that are covered by the read-indicator do not validate, the read-indicator STM commit process 800 continues to a 'clean-up and abort commit' terminal 813. The 'clean-up and abort commit' terminal 813 decrements the read-indicators that were incremented by the 'increment read-indicator' procedure 809, clears the drain flags on the read-indicators that were set by the 'set read-indicators to drain' procedure 805, releases the locks set by the 'acquire write-locks for the write-set' procedure 803, and aborts the transaction. In implementations that use SNZI objects, the 'increment read-indicator' procedure 809 can cause the transaction to arrive at an SNZI object and the 'set read-indicators to drain' procedure 805 can set the SNZI object's drain.

However, if the 'valid data value' decision procedure 811 is able to validate the pure read-set stripe, the read-indicator STM commit process 800 continues back to the 'iterate pure read-set stripes' procedure 807 to continue the iteration.

Once all the pure read-set stripes have been validated, the read-indicator STM commit process 800 continues to a 'store write-set data to shared memory' procedure 815 that stores the data values from the transaction's write-set into their corresponding write locations in the transactionally shared data region 113. Next a 'release write-locks' procedure 817 releases the locks acquired by the 'acquire write-locks for the write-set' procedure 803 (thus, allowing other transactions to modify those locations in the transactionally shared data region 113). Next, a 'decrement read-indicator for pure read-set stripes' procedure 819 decrements the read-indicators that were incremented by the 'increment read-indicator' procedure 809. In implementations that use SNZI objects, the 'decrement read-indicator for pure read-set stripes' procedure 819 can cause the transaction to depart from the SNZI object.

Now, an 'iterate write-set stripes' procedure 821 iterates each of the write-set stripes for which the 'set read-indicators to drain' procedure 805 set the drain flag in the drain field. As each write-set stripe is iterated, a 'wait for drain of stripe' procedure 823 waits for the read-indicator to be released by other transactions. Once all the transactions have released the read-indicator, a 'clear read-indicator drain' procedure 825 clears the drain flag for the read-indicator for that stripe, which allows other transactions (those that have loaded values from within the stripe covered by the read-indicator) to attempt to commit. Once all the write-set stripes are iterated and drained the transaction is complete and the read-indicator STM commit process 800 completes through an 'end commit' terminal 827. In implementations that use SNZI objects, the 'wait for drain of stripe' procedure 823 can query the SNZI object to detect when all transactions have departed and, when all the transactions have departed, the 'clear read-indicator drain' procedure 825 can clear the SNZI object's drain.

Once the transaction completes, any buffer freed from the transactionally shared data region 113 will be isolated from the transactional system.

Unlike with the read-write locks based solutions of FIG. 6 and FIG. 7, the read-indicator STM commit process 800 allows the isolating transaction (tx2) to acquire the write-lock associated with a read-indicator that is in use. However, the read-indicator STM commit process 800 does not complete until all read-indicators covered by the transaction's write-set are free. Thus, it provides the delay for implicit privatization while maximizing the parallelism between the isolating transaction (tx2) and a transaction accessing the isolated buffer (tx1).

One skilled in the art after comprehending the technology disclosed herein will understand that read-only transactions do not need to increment a read-indicator nor wait for transactional readers. This is because a transaction that does not execute any transactional stores cannot interfere with non-transactional stores (and hence isolating transactions do not need to wait for read-only transactions to complete). Furthermore read-only transactions cannot isolate a buffer from the transactionally shared data region 113 and so do not need to wait for any transactional readers to commit.

Setting and clearing the drain flag is one approach to guarantee that a transaction will complete (at the 'wait for drain of stripe' procedure 823) even if one or more transactional readers keep incrementing and decrementing the read-indicators. An alternative approach requires the transactional readers to check that the stripe associated with the read-indicator is not write-locked before incrementing the read-indicator (note that if the stripe is locked, the transactional reader is likely to fail the forthcoming validation of that stripe). This guarantees that a read-indicator associated with a write-locked stripe will eventually be released without the need for the drain flag (and hence eliminate the need for the 'set read-indicators to drain' procedure 805). However, this approach would need the corresponding variation of the read-indicator STM commit process 800 to hold the write-locks acquired by the 'acquire write-locks for the write-set' procedure 803 until the read-indicator is decremented to zero.

In some implementations of the disclosed technology the read-indicator can be incorporated into the stripe. This enables the 'increment read-indicator' procedure 809 and the 'valid data value' decision procedure 811 to be combined. Incorporating the read-indicator into the stripe allows the combined procedures to execute the read-validation of the stripe and the incrementing the read-indicator in one atomic operation. This reduces the latency of the read-indicator STM commit process 800. However, frequent modifications of the stripe due to read-indicator operations (increment, decrement, fetch) can limit scalability on traditional SMP machines, because a stripe is read on every transactional load operation.

While FIG. 6, FIG. 7, and FIG. 8 address the TL family STM mechanisms, one skilled in the art will appreciate the many variations that can be applied to other STM mechanisms. For example, with an STM that uses the "update-in-place" policy instead of the "speculative-store-buffer" policy, a transactional writer must wait for transactional readers that have not yet committed (because zombie transactions that accessed the buffer before it was isolated can still execute writes to the buffer before they discover that they were aborted). One skilled in the art, without undue experimentation, would be able to modify the previously described technology to increment the appropriate read-indicator when the load operation is executed (not only during the commit operation) and thus prevent latent transactional writes to a buffer from interleaving with non-transactional reads and writes in an update-in-place STM. Using the technology disclosed herein in an update-in-place STM may limit the opportunities for parallelism when compared to the use of the technology in a "speculative-store-buffer" STM because the read-indicators will be active longer; hence the transactional writers are likely to have a longer wait for the read-indicators to be released.

The technology disclosed herein can also be used with a hybrid hardware and software transactional memory system. Such a system requires that hardware and software transactions interoperate. In such embodiments, hardware transactions can load and track stripe locks that can be accessed by conflicting software transactions. For example, to interoperate with a TL family STM, a hardware transactional store can fetch the TL1/TL2-style versioned lockword and inspect the lock-bit. If set, the hardware transaction would abort itself and then retry with either another hardware attempt or a software attempt. The fetch of the location in the transactional metadata region 115 that checks the versioned lockword also enters the versioned lockword into the hardware transaction's read-set. A subsequent software transaction that acquires that lock will write (using an atomic operation) to the versioned lockword, thus forcing the abort of any pending hardware transactions tracking that word (or cache line containing that word) in their read-sets. For example, suppose that transactions tx1 and tx2 conflict because tx1 reads a variable X that tx2 writes. Further suppose that tx1 runs in hardware and tx2 runs in software. If the commit-phase of tx2 overlaps tx1's hardware transaction then either 1) tx1 inspects the lock-bit of the stripe lock covering X before tx2's commit-step acquires the lock, in which case tx2's stripe lock acquisition will abort tx1, or 2) tx1 inspects the lock-bit of the stripe lock covering x after tx2's commit-step acquires the lock, in which case tx1 will observe that the stripe lock is held by tx2 and tx1 will abort itself.

For a transactional memory that uses readers-writer locks, read-indicators or the like, acquiring and releasing readers-writer locks or incrementing and decrementing read-indicators (very similar in nature) can cause frequent write traffic to the locations in the transactional metadata region 115 holding the readers-writer locks or read-indicators, rendering concurrent hardware transactions highly vulnerable to false-positive aborts (because the stores to acquire and release or increment and decrement the readers-writer locks or read-indicators will abort otherwise non-conflicting hardware transactions).

To address this problem a hybrid transactional memory can store the read-indicators in locations of the shared memory that is spatially distinct from the locations in the shared memory where the versioned readers-writer locks are stored. In such an embodiment the STM read-indicator increment or decrement operations will access only the read-indicator storage while hardware transactions will fetch (and monitor) only the classic versioned write-locks and will not monitor the associated read-indicator storage. Thus incrementing and decrementing the read-indicator locations by the STM will not unnecessarily abort the concurrent hardware transactions. In a HyTM, a hardware transaction can isolate a portion of the transactionally shared data region 113 while a concurrent software transaction has pending transactional stores to that portion (that would trigger implicit privatization problem). If privatization is supported in the HyTM and if there is any possibility that the hardware transaction is operating concurrently with software transactions (mixed mode operation), the hardware transaction needs to delay returning control after it commits until it has verified that all the read-indicators associated with its write-set have quiesced and reached zero. This waiting phase is implemented in software responsive to the HTM hardware. Another approach is that instead of waiting for the read indicators of the write set locations to drain, the hardware transaction can require that the read indicators be zero and abort itself otherwise. This approach eliminates the need to track the write-set from within the hardware transaction in order to facilitate a subsequent waiting phase.

As used herein, a procedure is a self-consistent sequence of steps that can be performed by logic implemented by a programmed computer, specialized electronics or other circuitry or a combination thereof that leads to a desired result. These steps can be defined by one or more computer instructions. These steps can be performed by a computer executing the instructions that define the steps. Further, these steps can be performed by circuitry designed to perform the steps. Thus, the term "procedure" can refer (for example, but without limitation) to a sequence of instructions, a sequence of instructions organized within a programmed-procedure or programmed-function, a sequence of instructions organized within programmed-processes executing in one or more computers, or a sequence of steps performed by electronic or other circuitry, or any logic or combination of the foregoing. In particular, one skilled in the art would understand logics such as a delay logic, a comparison logic, a drain activation logic, a drain deactivation logic, an indicator logic, a lock acquisition logic, a lock release logic, a storage logic, a validation logic, a drain logic, an adjustment logic, etc. that correspond to what is disclosed herein. Such a one will also understand that one logic can be responsive to a second logic directly or indirectly by being responsive to one or more intermediate logics that are the second logic.

One skilled in the art will understand that the network carries information (such as informational data as well as data that defines a computer program). The information can also be propagated using a carrier-wave. Signals capable of propagating the information includes electromagnetic signals, visible or invisible light pulses, signals on a data bus, or signals propagated over any wire, wireless, or optical fiber technology that allows information to be transmitted over a network. Programs and data are commonly read from both tangible physical media (such as a compact, floppy, or magnetic disk) and from a network. Thus, the network, like a tangible physical media, is a computer-usable data carrier.

One skilled in the art will understand that the technology enables a transaction in a STM or HyTM to isolate a buffer from the transactionally shared data region 113 without the buffer being subsequently modified by other transactions.

From the foregoing, it will be appreciated that the technology has (without limitation) the following advantages:

1) the ability to implicitly isolate a transactional memory buffer from within a transaction such that no other transaction will modify the content of the buffer after it is isolated;

2) the ability to implicitly isolate a transactional memory buffer from within a transaction in both software and hybrid transactional memory systems.

3) the ability for hardware and software transactions to coexist and interoperate safely and transparently to the programmer;

4) the ability to implicitly isolate a transactional memory buffer simplifies conversion of legacy lock-based code to transactional memory transaction-based code; and 5) the ease of using legacy libraries in transactional programs, especially libraries that are designed to access data structures assuming that the data structures will not be concurrently accessed by other threads.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed follows:

1. A computer controlled method for committing a transaction to a shared memory, said shared memory in communication with one or more processors executing a plurality of threads, each of said one or more processors having the capability to operate a lock in said shared memory, said transaction having a read-set and a write-set, said read-set identifying a first read location of said shared memory covered by a first lock object, said write-set identifying a result data value to be stored at a first write location of said shared memory covered by a second lock object, said first lock object and said second lock object each comprising a writer lock, said method comprising:
   wherein said first read location is covered by a first indicator and said first write location is covered by a second indicator;
   acquiring said writer lock of said second lock object;
   said transaction arriving at said first indicator;
   storing said result data value at said first write location in said shared memory;
   releasing said writer lock of said second lock object subsequent to storing;
   said transaction departing from said first indicator subsequent to storing; and
   waiting, subsequent to storing, for said second indicator to drain, wherein said waiting comprises waiting for other contemporaneous transactions that have arrived at the second indicator to depart the second indicator,
   wherein said first indicator comprises a reader counter, and wherein at least one of arriving at and departing from said first indicator comprises changing a value of said reader counter by an amount.

2. The computer controlled method of claim 1, wherein said first indicator is a first read-indicator that comprises a drain field, and wherein arriving at said first indicator comprises changing the value of said reader counter by an amount, and departing from said first indicator comprises changing the value of said reader counter by the inverse of said amount.

3. The computer controlled method of claim 1, wherein said first indicator is a scalable non-zero indicator.

4. The computer controlled method of claim 1, wherein said second indicator further comprises a drain capability, and the method further comprises:
   setting a drain field on said second indicator; and wherein waiting further comprises:
   clearing said drain field on said second indicator.

5. The computer controlled method of claim 1, further comprising validating said first read-set entry against a commit-time data value of said first read location in said shared memory subsequent to the arriving.

6. The computer controlled method of claim 5, wherein said first lock object further comprises a version number field, and wherein validating said first read-set entry against said commit-time data value of said first read location in said shared memory comprises comparing a first version number acquired from said version number field of said first lock object when said first read-set entry was added to said read-set with a subsequent version number acquired from said version number field of said first lock object.

7. An apparatus for committing a transaction to a shared memory, said shared memory in communication with one or more processors executing a plurality of threads, each of said one or more processors having the capability to operate a lock in said shared memory, said transaction having a read-set and a write-set, said read-set identifying a first read location of said shared memory covered by a first lock object, said write-set identifying a result data value to be stored at a first write location of said shared memory covered by a second lock object, said first lock object and said second lock object each comprising a writer lock, said apparatus comprising:
   at least one of the processors;
   a first indicator covering said first read location;

a second indicator covering said first write location;

a lock acquisition logic configured to acquire said writer lock of said second lock object;

a first indicator logic configured to cause said transaction to arrive at said first indicator;

a storage logic configured to store said result data value at said first write location in said shared memory responsive to the first indicator logic and the lock acquisition logic;

a lock release logic, responsive to the storage logic, configured to release said writer lock of said second lock object;

a second indicator logic, responsive to the storage logic, configured to cause said transaction to depart from said first indicator; and a delay logic, responsive to said storage logic, configured to wait for said second indicator to drain, wherein said waiting comprises waiting for other contemporaneous transactions that have arrived at the second indicator to depart the second indicator, wherein said first indicator comprises a reader counter, and wherein at least one of the first indicator logic and the second indicator logic further comprises logic configured to change a value of said read counter.

8. The apparatus of claim 7, wherein said first indicator is a first read-indicator that comprises a drain field, and wherein the first indicator logic further comprises a first adjustment logic configured to change the value of said reader counter by an amount and the second indicator logic further comprises a second adjustment logic configured to change the value of said reader counter by the inverse of said amount.

9. The apparatus of claim 7, wherein said first indicator is a scalable non-zero indicator.

10. The apparatus of claim 7, wherein said second indicator further comprises a drain logic, and the apparatus further comprises:

a drain activation logic configured to set a drain field on said second indicator; and wherein the delay logic further comprises:

a drain deactivation logic configured to clear said drain field on said second indicator.

11. The apparatus of claim 7, further comprising a validation logic, responsive to the lock acquisition logic, configured to validate said first read-set entry against a commit-time data value of said first read location in said shared memory.

12. The apparatus of claim 11, wherein said first lock object further comprises a version number field, and wherein the validation logic further comprises a comparison logic configured to compare a first version number acquired from said version number field of said first lock object when said first read-set entry was added to said read-set with a subsequent version number acquired from said version number field of said first lock object.

13. The apparatus of claim 7, comprising a portion of a hybrid transactional memory.

14. A non-transitory computer program product comprising a non-transitory computer-usable data carrier providing instructions that, when executed by a computer, cause said computer to perform a method for committing a transaction to a shared memory, said shared memory in communication with one or more processors executing a plurality of threads, each of said one or more processors having the capability to operate a lock in said shared memory, said transaction having a read-set and a write-set, said read-set identifying a first read location of said shared memory covered by a first lock object, said write-set identifying a result data value to be stored at a first write location of said shared memory covered by a second lock object, said first lock object and said second lock object each comprising a writer lock, said method comprising:

wherein said first read location is covered by a first indicator and said first write location is covered by a second indicator;

acquiring said writer lock of said second lock object;

said transaction arriving at said first indicator;

storing said result data value at said first write location in said shared memory;

releasing said writer lock of said second lock object subsequent to storing;

said transaction departing from said first indicator subsequent to storing; and waiting, subsequent to storing, for said second indicator to drain, wherein said waiting comprises waiting for other contemporaneous transactions that have arrived at the second indicator to depart the second indicator, wherein said first indicator comprises a reader counter, and wherein at least one of arriving at and departing from said first indicator comprises changing a value of said reader counter by an amount.

15. The computer program product of claim 14, wherein said first indicator is a first read-indicator that comprises a drain field, and wherein arriving at said first indicator comprises changing the value of said reader counter by an amount, and departing from said first indicator comprises changing the value of said reader counter by the inverse of said amount.

16. The computer program product of claim 14, wherein said first indicator is a scalable non-zero indicator.

17. The computer program product of claim 14, wherein said second indicator further comprises a drain capability, and the method further comprises:

setting a drain field on said second indicator; and wherein waiting further comprises:

clearing said drain field on said second indicator.

18. The computer program product of claim 14, further comprising validating said first read-set entry against a commit-time data value of said first read location in said shared memory subsequent to the arriving.

19. The computer program product of claim 18, wherein said first lock object further comprises a version number field, and wherein validating said first read-set entry against said commit-time data value of said first read location in said shared memory comprises comparing a first version number acquired from said version number field of said first lock object when said first read-set entry was added to said read-set with a subsequent version number acquired from said version number field of said first lock object.

* * * * *